UNITED STATES PATENT OFFICE.

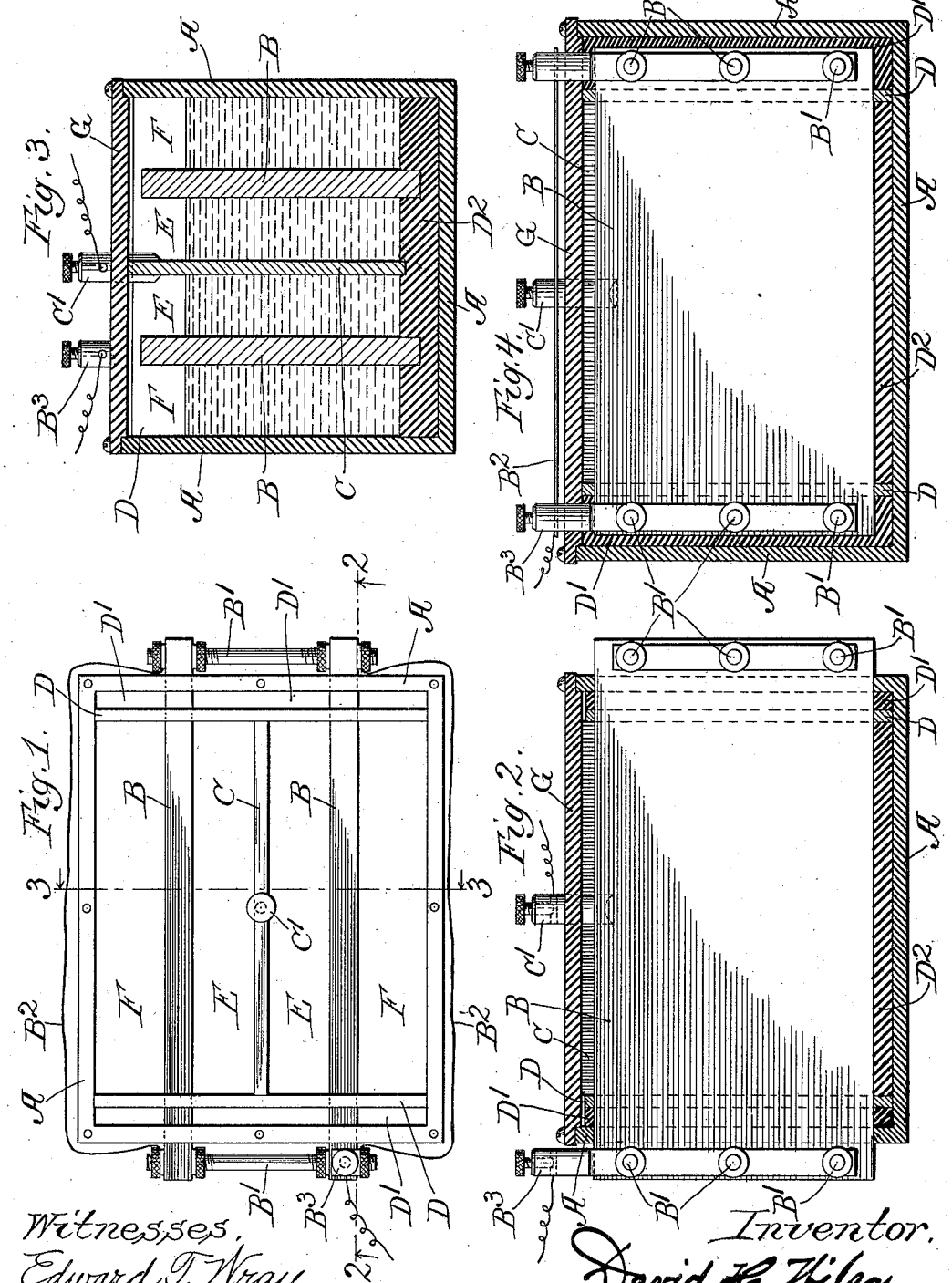

DAVID H. WILSON, OF CHICAGO, ILLINOIS.

ELECTRIC BATTERY.

1,072,551. Specification of Letters Patent. Patented Sept. 9, 1913.

Application filed September 18, 1905. Serial No. 278,847.

*To all whom it may concern:*

Be it known that I, DAVID H. WILSON, a citizen of the United States, residing at Chicago, in the county of Cook and State of Illinois, have invented a certain new and useful Improvement in Electric Batteries, of which the following is a specification.

My invention relates to electric batteries, and has for its object to provide a new and improved battery of this description.

My invention is illustrated in the accompanying drawings, wherein—

Figure 1 is a plan view with cover removed of a battery embodying my invention; Fig. 2 is a sectional view taken on line 2—2 of Fig. 1, with cover in position; Fig. 3 is a sectional view taken on line 3—3 of Fig. 1; Fig. 4 is a view showing a modified construction.

Like letters refer to like parts throughout the several figures.

Referring now to Figs. 1, 2 and 3, I have shown an electric battery comprising a suitable receptacle, A. Within this receptacle are located the two electrodes of the battery, B and C. The electrode B as herein shown is made of carbon, and the electrode C of zinc. In these figures I have shown two carbon plates. The ends of the carbon plates project through the receptacle and are electrically connected together in any desired manner, as by the bolts $B^1$. The two ends of these carbon plates are electrically connected together by the conductors $B^2$. One conductor may be used if desired because of the fact that the two carbons are electrically connected together at the ends. The exposed ends of the carbon plates are preferably copper plated so as to prevent the fluid of the battery from escaping through the pores thereof, and will also aid in making proper electrical contact. The zinc electrode C is placed between the two carbon plates. Suitable partitions D are preferably provided, and the space between these partitions and the receptacle is filled with paraffin or other material as shown at $D^1$. The bottom of the receptacle is also covered with paraffin as shown at $D^2$, Fig. 3, the carbon plates projecting into the paraffin so as to separate the receptacle into compartments. The active material is placed in the space E and the depolarizing material in the spaces F. The zinc is provided with a suitable binding post $C^1$ and the carbons with a suitable binding post $B^3$. A suitable cover G is provided for the battery. As illustrated in Fig. 4 the carbons do not project through the receptacle but are contained entirely within it. The conductor $B^2$ which connects the ends of the carbon together preferably pass along the top of the battery as shown. It will be seen that by means of this construction very large electrodes can be used, and thus a large carrying surface is provided and an effective and economical battery produced.

I have shown in detail particular constructions embodying my invention, but it is, of course, evident that the form, construction and arrangement of the battery may be varied in many particulars, and I, therefore, do not limit myself to the particular constructions shown.

I claim.

1. An electric battery comprising a receptacle a positive electrode therein, two carbon electrodes therein, both ends of each of said electrodes projecting through the receptacle, the associated projecting ends electrically connected together, the separated ends of each electrode electrically connected together by an electrical conductor separate from the electrode.

2. An electric battery comprising a receptacle a positive electrode therein, two carbon electrodes therein, both ends of each of said electrodes projecting through the receptacle, a separate conductor by which the associated projecting ends are electrically connected together, the separated ends of each electrode connected together by an electrical conductor, and a layer of protecting material on the inside of the receptacle at the points where the electrodes project therethrough.

3. An electric battery comprising a receptacle, two carbon electrodes therein, said receptacle provided with openings, the ends of both of said electrodes projecting through said openings, bolts at the ends of said electrodes and outside of said receptacle, said bolts connecting said ends together.

DAVID H. WILSON.

Witnesses:
HOMER L. KRAFT,
EDNA K. REYNOLDS.

Copies of this patent may be obtained for five cents each, by addressing the "Commissioner of Patents, Washington, D. C."